United States Patent
Kaji et al.

(10) Patent No.: US 12,122,926 B2
(45) Date of Patent: Oct. 22, 2024

(54) COLORED DISPERSION FOR INKJET, INKJET RECORDING INK, AND INKJET RECORDING METHOD

(71) Applicant: Nippon Kayaku Kabushiki Kaisha, Tokyo (JP)

(72) Inventors: Yuki Kaji, Tokyo (JP); Maiko Iwami, Tokyo (JP); Michiaki Takeda, Tokyo (JP); Aiko Matsumura, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 125 days.

(21) Appl. No.: 18/004,845

(22) PCT Filed: Jul. 29, 2021

(86) PCT No.: PCT/JP2021/028045
§ 371 (c)(1),
(2) Date: Jan. 9, 2023

(87) PCT Pub. No.: WO2022/025166
PCT Pub. Date: Feb. 3, 2022

(65) Prior Publication Data
US 2023/0257605 A1  Aug. 17, 2023

(30) Foreign Application Priority Data
Jul. 30, 2020 (JP) ................. 2020-129258

(51) Int. Cl.
C09D 11/326 (2014.01)
B41M 5/00 (2006.01)
C09D 11/328 (2014.01)
C09D 11/38 (2014.01)

(52) U.S. Cl.
CPC .......... *C09D 11/326* (2013.01); *B41M 5/0011* (2013.01); *C09D 11/328* (2013.01); *C09D 11/38* (2013.01)

(58) Field of Classification Search
CPC ............... C09D 11/326; C09D 11/107; C09D 11/322; C09D 11/38; C09D 11/30; C09D 11/328; C09D 11/40; C09D 17/001; C09D 153/00; C09D 11/00; C09D 11/02; C09D 11/037; B41M 5/0011; B41M 5/0023; B41M 5/0017; B41M 5/0047; B41M 5/5218; B41J 2/01; B41J 2/2107
See application file for complete search history.

(56) References Cited

U.S. PATENT DOCUMENTS

| | | | |
|---|---|---|---|
| 2014/0363642 A1* | 12/2014 | Kawaguchi | C09D 17/001 524/106 |
| 2015/0011687 A1 | 1/2015 | Shimanaka et al. | |
| 2016/0060473 A1 | 3/2016 | Sano et al. | |
| 2017/0088732 A1 | 3/2017 | Koganehira | |
| 2018/0111388 A1* | 4/2018 | Fujita | B41J 11/00216 |
| 2019/0002620 A1 | 1/2019 | Umemoto | |

FOREIGN PATENT DOCUMENTS

| | | |
|---|---|---|
| EP | 2330154 A1 | 6/2011 |
| JP | 2011-068865 A | 4/2011 |
| JP | 2012-021120 A | 2/2012 |
| JP | 2012-036251 A | 2/2012 |
| JP | 2013-075795 A | 4/2013 |
| JP | 2013-166867 A | 8/2013 |
| JP | 2014-015541 A | 1/2014 |
| JP | 2014-240451 A | 12/2014 |
| JP | 2016-050220 A | 4/2016 |
| JP | 2017-066215 A | 4/2017 |
| JP | 2021-098835 A | 7/2021 |
| WO | WO 2017/135011 A1 | 8/2017 |

OTHER PUBLICATIONS

Extended European Search Report issued Jul. 23, 2024 in European Patent Application No. 21849351.8, in 5 pages.

* cited by examiner

*Primary Examiner* — Jannelle M Lebron
(74) *Attorney, Agent, or Firm* — Knobbe, Martens, Olson & Bear, LLP

(57) ABSTRACT

A colored dispersion for inkjet and a method for producing the same, the colored dispersion including a colorant, a dispersant, a tellurium compound, and water, in which the dispersant is an A-B block polymer; monomers constituting an A block are (meth)acrylic acid and butyl (meth)acrylate; the content of the (meth)acrylic acid in the A block is 26-42 mass %; a monomer constituting a B block includes cyclohexyl (meth)acrylate; the acid value of the dispersant is 100-159 mg KOH/g; and the mass-average molecular weight of the dispersant is 10,000-50,000. An inkjet recording ink containing the dispersion; an inkjet recording method using the ink; recording media to which the ink adheres; and an inkjet printer equipped with a container containing the ink.

14 Claims, No Drawings

COLORED DISPERSION FOR INKJET, INKJET RECORDING INK, AND INKJET RECORDING METHOD

This application is the U.S. National Phase under 35 U.S.C. § 371 of International Application PCT/JP2021/028045, filed Jul. 29, 2021, designating the U.S., and published in Japanese as WO 2022/025166 on Feb. 3, 2022, which claims priority to Japanese Patent Application No. 2020-129258, filed Jul. 30, 2020, the entire content of which are incorporated herein by reference.

TECHNICAL FIELD

The present invention relates to a colored dispersion for inkjet, an inkjet recording ink containing the dispersion, and an inkjet recording method using the ink.

BACKGROUND ART

A recording method (inkjet recording method) using an inkjet printer, which is one of typical methods among various types of color recording methods, is a method in which recording is performed by generating ink droplets and causing the droplets to adhere to various types of recording media (paper, plastic film, fabric and the like). The recording method has such a feature that downsizing and speeding-up are easy, and therefore has recently been coming into widespread use and is expected to largely expand also from now on.

In the inkjet recording method, there are cases where recording media having a high ink absorbing ability are used, such as exclusive paper for inkjet having an ink receiving layer, glossy paper and general-purpose plain paper, and besides, cases where ink-poorly absorbing recording media having a low ink absorbing ability are used, such as coat paper and plastic film, and cases where ink-non-absorbing recording media absorbing no ink at all are used. In the case of performing printing on such ink-poorly absorbing or ink-non-absorbing recording media with an aqueous inkjet ink, drying takes much time since the ink is difficult to permeate the recording media. Hence, in the case of performing high-speed automatic perfecting printing in which a recording medium on which surface printing has been made is instantly reversed in an inkjet printer and printing is performed on its back surface, undried ink poses problems including contamination of a reversing roller and the like in some cases.

In order to solve the above problem, inks high in dryability have been proposed. Such inks high in dryability, however, have such a problem that clogging is easily caused in the region of a nozzle of an inkjet head. When colorants and solid materials such as resin microparticles in inks cause clogging of a nozzle, such a problem is posed that the ejection of the inks cannot be carried out stably and the image quality of printed images is remarkably deteriorated.

Such problems can be solved by improving the re-dispersibility of the inks after being dried. This is because even if an ink is dried in the region of a nozzle, if the dried ink is re-dispersed by the ink itself freshly fed from in a head to the nozzle and it becomes difficult for clogging to be caused, the above problems can be solved and the ejection stability can be enhanced. In order to improve the re-dispersibility of an aqueous inkjet ink, it is effective to raise the hydrophilicity of a dispersant dispersing colorants in the ink. Raising the hydrophilicity of a dispersant results in lowering the water resistance of recorded images and there arises such a concern that when water adheres to printed matter and the printed matter is rubbed, peeling of images would easily occur. The re-dispersibility and the water resistance are thus conflicting performance features, and there is a strong demand for inks simultaneously satisfying both the performance features in a well balanced manner.

Patent Document 1 discloses an ink composition which is construed as being capable of forming images excellent in tackiness, fixability and water resistance in an ink-poorly absorbing or ink-non-absorbing recording medium.

Patent Document 2 discloses an ink which is construed, also when printing is performed on a non-porous substrate, as exhibiting good dryability and giving high glossiness, abrasion resistance and ethanol resistance to printed parts.

Patent Document 1: Japanese Unexamined Patent Application, Publication No. 2017-66215
Patent Document 2: Japanese Unexamined Patent Application, Publication No. 2014-240451

DISCLOSURE OF THE INVENTION

Problems to be Solved by the Invention

It is an object of the present invention to provide a colored dispersion for inkjet excellent in the re-dispersibility after being dried, and excellent also in the water resistance of recorded images, an inkjet recording ink containing the dispersion, and an inkjet recording method using the ink.

Means for Solving the Problems

Specific means to solve the above problem include the following embodiments.

1) A colored dispersion for inkjet, containing a colorant, a dispersant, a tellurium compound, and water, wherein the dispersant is an A-B block polymer; monomers constituting the A block of the A-B block polymer are (meth)acrylic acid and butyl (meth)acrylate; the content of the (meth)acrylic acid in the total mass of the monomers constituting the A block is 26 to 42% by mass; and a monomer constituting the B block of the A-B block polymer includes cyclohexyl (meth)acrylate;

the dispersant has an acid value of 100 to 159 mgKOH/g; and the dispersant has a mass average molecular weight of 10,000 to 50,000.

2) The colored dispersion for inkjet according to 1), wherein the total content of the tellurium compound in terms of metal tellurium is 160 ppm or lower in terms of mass.

3) The colored dispersion for inkjet according to 1) or 2), wherein the dispersant has an acid value of 112 to 135 mgKOH/g.

4) The colored dispersion for inkjet according to any one of 1) to 3), wherein the dispersant has a mass average molecular weight of 10,000 to 30,000.

5) The colored dispersion for inkjet according to any one of 1) to 4), wherein the colorant is a colorant selected from the group consisting of pigments and disperse dyes.

6) The colored dispersion for inkjet according to any one of 1) to 5), wherein the monomer constituting the B block of the A-B block polymer includes (meth)acrylic acid.

7) An inkjet recording ink, containing the colored dispersion for inkjet according to any one of 1) to 6).

8) An inkjet recording method, wherein recording on a recording medium is performed by ejecting droplets of the inkjet recording ink according to 7).

9) The inkjet recording method according to 8), wherein the recording medium is an ink-poorly absorbing or ink-non-absorbing recording medium.

10) The inkjet recording method according to 9), wherein the recording medium is a recording medium having been subjected to at least one surface modification treatment selected from the group consisting of corona discharge treatment, plasma treatment and flame treatment.

11) A recording medium, which is colored with the inkjet recording ink according to 7).

12) An inkjet printer loaded with a container containing the inkjet recording ink according to 7).

13) A method for producing the colored dispersion for inkjet according to any one of 1) to 6), including a step of coating a surface of the colorant with the dispersant.

14) The production method according to 13), wherein the surface of the colorant is coated with the dispersant by a phase inversion emulsification method.

Effects of the Invention

According to the present invention, there can be provided a colored dispersion for inkjet excellent in the re-dispersibility after being dried, and excellent also in the water resistance of recorded images, an inkjet recording ink containing the dispersion, and an inkjet recording method using the ink.

PREFERRED MODE FOR CARRYING OUT THE INVENTION

Hereinafter, specific embodiments under the application of the present invention will be described in detail. In the present description, with regard to each component contained in the colored dispersion for inkjet and the inkjet recording ink, any one kind may be used singly, or two or more kinds may be used concurrently. In the present description, the term, "(meth)acrylic acid" is used in the meaning including both of "acrylic acid" and "methacrylic acid". The same applies to "(meth)acrylate" and the like. In the present description, when a unit is indicated only on one limit of the range of upper and lower limits, like "X to Y % by mass" or the like, the units of the upper and lower limits are the same, that is, the indication means "X % by mass to Y % by mass" or the like.

<Colored Dispersion for Inkjet>

A colored dispersion for inkjet (hereinafter, also referred to as "dispersion") according to the present embodiment contains a colorant, a dispersant, a tellurium compound, and water, wherein the dispersant is an A-B block polymer; monomers constituting the A block of the A-B block polymer are (meth)acrylic acid and butyl (meth)acrylate; the content of the (meth)acrylic acid in the total mass of the monomers constituting the A block is 26 to 42% by mass; and a monomer constituting the B block of the A-B block polymer includes cyclohexyl (meth)acrylate; the dispersant has an acid value of 100 to 159 mgKOH/g; and the dispersant has a mass average molecular weight of 10,000 to 50,000. Hereinafter, components contained in the dispersion according to the present embodiment will be described in detail.

[Colorant]

The colorant to be contained in the dispersion according to the present embodiment is not limited as long as being a water-insoluble colorant, and well-known pigments, disperse dyes and the like can be used. In the present description, the water-insoluble colorant means a colorant whose solubility to water at 25° C. is usually 5 g/L or lower, preferably 3 g/L or lower, more preferably 1 g/L or lower and still more preferably 0.5 g/L or lower. The lower limit of the solubility includes 0 g/L. Here, unless otherwise specified, the "colorant" means a "water-insoluble colorant".

The pigments include inorganic pigments, organic pigments and extender pigments, and any pigments can be used. Further, it is possible to combine these pigments, and a dispersion can also be prepared, for example, by adding an extender pigment in an organic pigment.

Examples of the inorganic pigments include carbon black, titanium oxide, metal oxides, metal hydroxides, metal sulfides, metal ferrocyanides, and metal chlorides.

In the case of making a black dispersion, preferable as an inorganic pigment is carbon black such as thermal black, acetylene black, oil furnace black, gas furnace black, lamp black, gas black, or channel black. Examples of commercially available products of carbon black include Raven Series, manufactured by Columbian Carbon Co.; Monarch Series, Regal Series and Mogul Series, manufactured by Cabot Corp.; HiBlack series, ColorBlack Series, Printex Series, SpecialBlack Series and Nerox Series, manufactured by Orion Engineered Carbons S.A.; MA Series, MCF Series, No. 25, No. 33, No. 40, No. 47, No. 52, No. 900 and No. 2300, manufactured by Mitsubishi Chemical Corp.; and the like.

Examples of inorganic pigments other than carbon black include C.I. Pigment White 6 and 27; aluminum hydroxide; and the like.

Examples of the organic pigments include various types of pigments such as azo, diazo, phthalocyanine, quinacridone, isoindolinone, dioxazine, perylene, perinone, thioindigo, anthraquinone and quinophthalone. These organic pigments can also be used concurrently with the above inorganic pigments. For example, in order to improve the fluidity of a solid, an organic pigment and an extender pigment can be used concurrently.

Examples of the organic pigments include yellow pigments such as C.I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 180, 185, 193, 199, 202 and 213; red pigments such as C.I. Pigment Red 5, 7, 12, 48, 48:1, 57, 88, 112, 122, 123, 146, 149, 150, 166, 168, 177, 178, 179, 184, 185, 202, 206, 207, 254, 255, 257, 260, 264, 269 and 272; blue pigments such as C.I. Pigment Blue 1, 2, 3, 15, 15:1, 15:2, 15:3, 15:4, 15:6, 16, 22, 25, 60, 66 and 80; violet pigments such as C.I. Pigment Violet 19, 23, 29, 37, 38 and 50; orange pigments such as C.I. Pigment Orange 13, 16, 43, 68, 69, 71 and 73; green pigments such as C.I. Pigment Green 7, 36 and 54; black pigments such as C.I. Pigment Black 1; and the like.

Examples of the extender pigments include silica, calcium carbonate, talc, clay, barium sulfate and white carbon. The extender pigments are used concurrently with other colorants in many cases.

The disperse dyes include well-known disperse dyes. Among these, preferable are dyes selected from C.I. Dispers. Specific examples thereof include yellow dyes such as C.I. Dispers Yellow 9, 23, 33, 42, 49, 54, 58, 60, 64, 66, 71, 76, 79, 83, 86, 90, 93, 99, 114, 116, 119, 122, 126, 149, 160, 163, 165, 180, 183, 186, 198, 200, 211, 224, 226, 227, 231 and 237; red dyes such as C.I. Dispers Red 60, 73, 88, 91, 92,111, 127, 131, 143, 145, 146, 152, 153, 154, 167, 179, 191, 192, 206, 221, 258 and 283; orange dyes such as C.I. Dispers Orange 9, 25, 29, 30, 31, 32, 37, 38, 42, 44, 45, 53, 54, 55, 56, 61, 71, 73, 76, 80, 96 and 97; violet dyes such as C.I. Dispers Violet 25, 27, 28, 54, 57, 60, 73, 77, 79 and 79:1; blue dyes such as C.I. Dispers Blue 27, 56, 60, 79:1, 87, 143, 165, 165:1, 165:2, 181, 185, 197, 202, 225, 257, 266, 267, 281, 341, 353, 354, 358, 364, 365 and 368; and the like.

The average particle size of the colorant is usually 50 to 300 nm and preferably 60 to 250 nm. In the present description, the "average particle size" means an average particle size measured by using a laser light scattering method.

It is preferable that the colorant is one coated with a dispersant on its surface. In the present description, "being coated" includes both of a state that a part of the surface of the colorant is coated with a dispersant, and a state that the whole of the surface thereof is coated with the dispersant.

The content of the colorant with respect to the total mass of the dispersion according to the present embodiment is usually 0.1 to 30% by mass, preferably 0.5 to 20% by mass and more preferably 1 to 15% by mass. The content of the colorant with respect to the total mass of an ink according to the present embodiment described later is usually 1 to 30% by mass, preferably 1 to 10% by mass and more preferably 2 to 7% by mass.

[Dispersant]

The dispersant to be contained in the dispersion according to the present embodiment is an A-B block polymer. The A-B block polymer means a polymer in which an A polymer (hereinafter, referred to as "A block") and a B polymer (hereinafter, referred to as "B block") are chemically bonded, and A and B each mean a polymer composed of one or more addition-polymerizable monomers.

Hereinafter, the role of the A-B block polymer (hereinafter, also referred to as "block copolymer") in dispersing the colorant will be described in detail.

As means of stabilizing dispersing of a colorant in water, there is used means in which usually by using a polymeric dispersant for resins and the like, aggregation of colorant particles is inhibited by the entropy repulsion, the ionic repulsion or the steric repulsion, to stabilize the dispersing state. Here, the polymeric dispersant refers to a polymer which has a hydrophilic moiety and a hydrophobic moiety wherein the hydrophobic moiety functions to be adsorbed on the colorant surface and the hydrophilic moiety functions to be dispersed in water. As the above polymeric dispersant, there are mainly used a random polymer (hereinafter, also referred to as "random copolymer") in which a hydrophilic moiety and a hydrophobic moiety are randomly arranged, and the above block copolymer.

The random copolymer, in which the hydrophilic moiety and the hydrophobic moiety are randomly arranged, is adsorbed sparsely on a colorant surface, resulting in that the random copolymer cannot sufficiently coat the colorant surface, and is insufficient in the affinity for a liquid medium such as water or a water-soluble organic solvent in some cases. Under attack in this state by a solvent in an ink, a dispersant may easily be exfoliated, causing aggregation of the colorant.

By contrast, due to the fact that the block copolymer has such a structure that a polymer in which hydrophilic moieties are continuously arranged and a polymer in which hydrophobic moieties are continuously arranged are bonded, and as compared with the random copolymer, can be adsorbed on the colorant surface with a larger area coated with the block copolymer, and the hydrophilic block has a high affinity for a liquid medium, the dispersant, even when being attacked by a solvent or the like, hardly causes desorption and can hold a stable dispersing state. Further, the block copolymer is higher in hydrophilicity as compared with the random copolymer, and makes easy the re-dispersing by an ink freshly fed even when the ink is dried in the region of a nozzle, whereby there can be expected the effect of making it difficult for clogging of the nozzle to be caused. On the other hand, since the block copolymer is high also in the dispersing stability, even if when an ink is dried on a recording medium, moisture in the ink first evaporates and the relative concentration of a solvent in the ink rises, the ink can be formed into a coating film without causing the aggregation of the colorant. Consequently, there is formed the coating film which is high in smoothness and whose surface is covered with a resin, whereby the effect of high water resistance can be expected.

As a method of obtaining the above block copolymer, there is known the TERP (Organotellurium-Mediated Living Radical Polymerization) method using an organotellurium compound. Hereinafter, the TERP method will be described in detail.

The TERP method is a polymerization method of using an organotellurium compound as a chain transfer agent and polymerizing a radically polymerizing compound (vinyl monomer), and the method is described, for example, also in International Publication Nos. WO2004/14848, WO2004/14962, WO2004/072126 and WO2004/096870. Specific polymerization methods of the TERP method include the following (a) to (d).

(a) Vinyl monomers are polymerized by using an organotellurium compound represented by the following formula (1).

(b) Vinyl monomers are polymerized by using a mixture of an organotellurium compound represented by the following formula (1) with an azo polymerization initiator.

(c) Vinyl monomers are polymerized by using a mixture of an organotellurium compound represented by the following formula (1) and an organoditelluride compound represented by the following formula (2).

(d) Vinyl monomers are polymerized by using a mixture of an organotellurium compound represented by the following formula (1) with an azo polymerization initiator and an organoditelluride compound represented by the following formula (2).

In the formula (1), $R^1$ represents an alkyl group having 1 to 8 carbon atoms, an aryl group or an aromatic heterocyclic group; $R^2$ and $R^3$ each independently represent a hydrogen atom or an alkyl group having 1 to 8 carbon atoms; $R^4$ represents an alkyl group having 1 to 8 carbon atoms, an aryl group, a substituted aryl group, an aromatic heterocyclic group, an alkoxy group, an acyl group, an amido group, an oxycarbonyl group, a cyano group, an allyl group or a propargyl group. In the formula (2), $R^1$ represents an alkyl group having 1 to 8 carbon atoms, an aryl group or an aromatic heterocyclic group.

Specific examples of the organotellurium compound represented by the above formula (1) include ethyl-2-methyl-2-n-butyltellanyl-propionate, ethyl-2-n-butyltellanyl-propionate, (2-hydroxyethyl)-2-methyl-methyltellanyl-propionate and additionally, compounds described in International Publication Nos. WO2004/14848, WO2004/14962, WO2004/072126 and WO2004/096870. Specific examples of the organoditelluride compound represented by the above formula (2) include dimethyl ditelluride and dibutyl ditelluride. The azo polymerization initiator is not limited as long as being an azo polymerization initiator used in usual radical polymerization, and examples thereof include 2,2'-azobis(isobutyronitrile) (AIBN), 2,2'-azobis(2,4-dimethylvaleronitrile) (ADVN), 1,1'-azobis(1-cyclohexanecarbonitrile) (ACHN), and 2,2'-azobis(4-methoxy-2,4-dimethylvaleronitrile) (V-70).

In the polymerization step, in a vessel whose atmosphere has been substituted by an inert gas, there are mixed vinyl monomers, and an organotellurium compound represented by the above formula (1), and for the purpose of reaction promotion and control of the molecular weight, the molecular weight distribution, and the like according to the kinds of the vinyl monomers, further an azo polymerization initiator and/or an organoditelluride compound represented by the above formula (2). The inert gas includes nitrogen, argon and helium, and argon and nitrogen are preferable. The amounts of vinyl monomers to be used in the above (a) to (d) may suitably be adjusted according to the physical properties of a target copolymer.

The polymerization reaction can be carried out even in a solventless condition, but may be carried out by using an aprotic solvent or protic solvent usually used in radical polymerization and stirring the above mixture. Examples of the aprotic solvent include anisole, benzene, toluene, propylene glycol monomethyl ether acetate, ethyl acetate and tetrahydrofuran (THF). Examples of the protic solvent include water, methanol and 1-methoxy-2-propanol. The solvent may be used singly in one kind or concurrently in two or more kinds. The amount of the solvent to be used is not limited, and is, for example, preferably 0.01 to 50 mL with respect to 1 g of the vinyl monomers. The reaction temperature and the reaction time may suitably be regulated according to the molecular weight and the molecular weight distribution of a copolymer to be obtained, but stirring is carried out usually at 0 to 150° C. for 1 min to 100 hours. After the finish of the polymerization reaction, the solvent and the remaining vinyl monomers are subjected to removal treatment or the like from an obtained reaction mixture by a usual separation refinement means, whereby a target copolymer can be separated.

Monomers constituting the A block of the A-B block polymer are (meth)acrylic acid and butyl (meth)acrylate, and the combination of methacrylic acid and butyl methacrylate is preferable. A monomer constituting the B block of the A-B block polymer includes cyclohexyl (meth)acrylate, and it is preferable that the monomer includes cyclohexyl methacrylate. Due to that the A block having a hydrophilic moiety is dissolved in a liquid medium, and the B block having a hydrophobic moiety is adsorbed on the colorant surface, a stable dispersing state is materialized. The A block has a carboxy group and, by being neutralized with a neutralizing agent, can be dissolved in a liquid medium. On the other hand, the B block is almost insoluble to a liquid medium, and is adsorbed on the colorant surface which is strong in hydrophobicity in the liquid medium and holds a coating state. Cyclohexyl (meth)acrylate constituting the B block has a six-membered monocyclic saturated hydrocarbon group, and has a molecular structure which is high in hydrophobicity and flexible. Thereby, as compared with cyclic aromatic hydrocarbons having a planar structure and polycyclic saturated hydrocarbons which are restricted in the conformation which can be structurally assumed, the B block flexibly changes its structure to the various chemical surface modifications and structures of the colorant and can be adsorbed with a stronger interaction; consequently, a high dispersing stability can be attained even against an attack of a solvent in an ink.

The content of (meth)acrylic acid in the total mass of monomers constituting the A block is usually 26 to 42% by mass, preferably 31 to 40% by mass, more preferably 31 to 37% by mass and still more preferably 33 to 35% by mass. By making the lower limit of the content to be the above set rate, it is likely that a sufficient hydrophilicity as the dispersant can be attained and the dispersing stability and the re-dispersibility become good. Then, by making the upper limit of the content to be the above set rate, it is likely that a suitable hydrophilicity as the dispersant is held and desorption of the dispersant from the colorant becomes difficult, making the dispersing stability good.

The content of cyclohexyl (meth)acrylate in the total mass of monomers constituting the B block is usually 80 to 100% by mass, preferably 90 to 99.8% by mass and more preferably 95 to 99% by mass. The monomer constituting the B block may further include an additional monomer. The content of the additional monomer in the total mass of monomers constituting the B block is usually 0 to 20% by mass, preferably 0.2 to 10% by mass and more preferably 1 to 5% by mass. The additional monomer is preferably (meth)acrylic acid. The content of (meth)acrylic acid in the total mass of monomers constituting the B block is usually 0.1 to 10% by mass, and preferably 0.5 to 5% by mass. When the B block, which is hydrophobic, contains a small amount of (meth)acrylic acid, which is hydrophilic, it is likely that the flexibility of the structure of the dispersant in a liquid medium rises and it becomes easy for the dispersant to be adsorbed on the colorant, whereby the dispersing stability can be raised.

The proportion accounted for by the A block in the A-B block polymer is usually 10 to 90% by mass, more preferably 20 to 80% by mass and more preferably 30 to 70% by mass.

The dispersant has an acid value of 100 to 159 mgKOH/g, and preferably 112 to 135 mgKOH/g. By making the lower limit of the acid value to be the above set value, it is likely that a sufficient solubility to a liquid medium is attained and the re-dispersibility can be made good. Then, by making the upper limit of the acid value to be the above set value, it is likely that the water resistance and the color-developability of recorded images can be made good. Here, the acid value of the dispersant is measured by a method described in Examples described later.

The dispersant has a mass average molecular weight of 10,000 to 50,000, and preferably 10,000 to 30,000. Due to that the mass average molecular weight is made to be the above set value, it is likely that the stability of the dispersion can be made good. Here, the mass average molecular weight of the dispersant is measured by a method described in Examples described later.

An acid group of the dispersant can be neutralized by using a neutralizing agent. Examples of the neutralizing agent include hydroxides of alkali metals, hydroxides of alkaline earth metals, ammonias, aliphatic amine compounds and alcoholamine compounds.

Examples of the hydroxides of alkali metals include lithium hydroxide, sodium hydroxide and potassium hydroxide. Examples of the hydroxides of alkaline earth metals include beryllium hydroxide, magnesium hydroxide, calcium hydroxide and strontium hydroxide. Among these, the hydroxides of alkali metals are preferable and lithium hydroxide and sodium hydroxide are more preferable.

The ammonias are not limited, and may be a gas or may be a liquid in which ammonia is dissolved in water or an organic solvent. Among these, ammonia water is preferable.

Examples of the aliphatic amine compounds include monomethylamine, dimethylamine, trimethylamine, monoethylamine, diethylamine and trimethylamine.

Examples of the alcoholamine compounds include monoethanolamine, diethanolamine, triethanolamine, monopropanolamine, dipropanolamine, tripropanolamine, methylethanolamine, dimethylethanolamine and N-methyldiethanolamine.

The case where the dispersant is neutralized with a neutralizing agent of a theoretical equivalent weight with respect to the total amount of the acid group of the dispersant is "the degree of neutralization is 100%". The upper limit of the degree of neutralization can exceed 100%. The degree of neutralization of the dispersant is usually 30 to 200% and preferably 50 to 150%.

The total mass of the dispersant to the total mass of the colorant is usually represented by a numerical value called division ratio. The division ratio can be determined by the following expression.

Division ratio=a total mass of the dispersant/a total mass of the colorant

The division ratios in the dispersion according to the present embodiment and an ink according to the present embodiment described later are usually 0.1 to 1.0, preferably 0.1 to 0.6 and more preferably 0.1 to 0.5. Due to that the division ratio is made to be the above set value, it is likely that the dispersing stability is good and the deterioration of recorded images can be suppressed.

[Tellurium Compound Originated from a Chain Transfer Agent]

The growth terminal of a block copolymer obtained by the TERP method has a form of —TeR$^1$ (wherein R$^1$ has the same meaning as in the above formulae (1) and (2)), and the tellurium atom is removed from the growth terminal by a separation refinement means after the finish of the polymerization reaction. After the removal of the tellurium atom, a tellurium compound originated from a chain transfer agent remains in the block copolymer in some cases.

In the present embodiment, by separating and refining the block copolymer after the finish of the polymerization reaction, there can be controlled the content of the tellurium compound originated from the chain transfer agent. Hence, the content of the tellurium compound originated from the chain transfer agent in the total mass of the dispersion is not limited. The total content of the tellurium compound in terms of metal tellurium is, in terms of mass, 0.01 ppm or higher, preferably 0.1 ppm or higher and more preferably 1 ppm or higher, and preferably 160 ppm or lower.

[Water]

The dispersion according to the present embodiment is an aqueous dispersion containing water. Water that can be used is not limited, and preferable is water little in impurities such as inorganic ions. Such a water includes ion-exchange water and distilled water.

The content of the water to the total mass of the dispersion according to the present embodiment is usually 50 to 90% by mass, preferably 60 to 90% by mass and more preferably 70 to 90% by mass. The content of the water to the total amount of an ink according to the present embodiment described later is usually 20 to 90% by mass, preferably 35 to 90% by mass and more preferably 50 to 90% by mass.

[Method for Producing the Dispersion]

A method for producing the dispersion according to the present embodiment includes a step of dispersing the colorant. As a method of dispersing the colorant, a well-known method can be used. Examples thereof include methods using a sand mill (bead mill), a roll mill, a ball mill, a paint shaker, an ultrasonic disperser, or a microfluidizer. Then, it is preferable that after preparation of the dispersion, components whose particle size is large are removed by filtration, centrifugal separation or the like.

For the purpose of suppressing foaming in the preparation of the dispersion, a defoaming agent can be added in an ultralow amount. However, there are defoaming agents inhibiting dispersing and microparticulation, so it is preferable to use a defoaming agent which has no influence on the dispersing and the stability after the dispersing. Examples of the defoaming agent include silicone-based and acetylene glycol-based ones and the like. Examples of the silicon-based defoaming agents include Surfynol DF-58, manufactured by Nisshin Chemical Industry Co., Ltd., and BYK1770, manufactured by BYK-Chemie GmbH. Examples of the acetylene glycol-based defoaming agents include Olfine SK-14, manufactured by Nisshin Chemical Industry Co., Ltd.

It is preferable that the method for producing the dispersion according to the present embodiment further includes a step of coating the surface of the colorant with the dispersant. Thereby, there can be obtained the dispersion containing the colorant whose surface is coated with the dispersant. The step of coating the surface of the colorant with the dispersant may be carried out after the step of dispersing the colorant, or may also be carried out simultaneously with the step of dispersing the colorant.

A method of coating the surface of the colorant with the dispersant is roughly divided into physical mechanical methods and chemical methods. Examples of specific methods thereof include any well-known methods such as a surface deposition process and an interfacial polymerization process (surface polymerization process). Here, the surface deposition process is a process of coating the colorant by depositing the dispersant on the surface of the colorant by a method of regulating the pH of a liquid medium containing the colorant, a method of utilizing a difference in solubility of the colorant to a liquid medium, or the like. The process includes an acid precipitation process and a phase inversion emulsification process. The interfacial polymerization process is a process in which after compounds having a polymerizable functional group, such as monomers, oligomers and pigment derivatives, are adsorbed or bonded to the surface of the colorant, the polymerization reaction with other monomers forming the dispersant is carried out to form the dispersant covering the surface of the colorant. Among these, the surface deposition process is preferable and the phase inversion emulsification process is more preferable.

The phase inversion emulsification process is a process in which by mixing and dispersing the colorant and the dispersant in an organic solvent and further adding water, the dispersant is made to be adsorbed uniformly on the pigment surface. As specific production processes, the following six types are known.

1. A process in which a solution, containing the colorant dispersed therein, of the dispersant which is to disperse or dissolve in water, in a hydrophilic organic solvent, and a liquid containing water as its main component are mixed, and then, solvent removal is carried out. Here, examples of components other than water in the "liquid containing water as its main component" include surfactants and antiseptic agents.

2. A process in which a solution, containing the colorant dispersed therein, of the dispersant which is to disperse or dissolve in water by neutralization, in a hydrophilic organic solvent, and a mixed liquid containing water and a neutralizing agent are mixed, and then, solvent removal is carried out.

3. A process in which a solution, containing the colorant dispersed therein, of the dispersant which is to disperse or dissolve in water, in a mixed solvent of a hydrophilic organic solvent and a hydrophobic organic solvent, and a liquid containing water as its main component are mixed, and then, solvent removal is carried out.

4. A process in which a solution, containing the colorant dispersed therein, of the dispersant which is to disperse or dissolve in water by neutralization, in a mixed solvent of a hydrophilic organic solvent and a hydrophobic organic solvent, and a mixed liquid containing water and a neutralizing agent are mixed, and then, solvent removal is carried out.

5. A process in which the colorant, and a solution of the dispersant which is to disperse or dissolve in water, in a mixed solvent containing a hydrophilic organic solvent and water as its main components are mixed to disperse the pigment in the solution, and then, solvent removal is carried out.

6. A process in which a solution of the dispersant dissolved therein, in a hydrophobic organic solvent, and a liquid containing, as its main component, water containing a neutralizing agent are mixed to make an emulsion (emulsion or microemulsion) liquid; the colorant is added thereto and mixed and dispersed; water is further added; and then, solvent removal is carried out.

Examples of the above organic solvent include alcohol solvents, ketone solvents, ether solvents, aromatic hydrocarbon solvents, aliphatic hydrocarbon solvents, and halogenated aliphatic hydrocarbon solvents. Examples of the alcohol solvents include methanol, ethanol, propanol, isopropanol and butanol. Examples of the ketone solvents include acetone and 2-butanone.

As the above surfactants, for example, an above-mentioned defoaming agent can be used and also in the phase inversion emulsification method, can be added in such an amount that it does not inhibit dispersing.

Examples of the antiseptic agents include compounds such as organic sulfur-based, organic nitrogen sulfur-based, organic halogen-based, haloaryl sulfone-based, iodopropargyl-based, haloalkylthio-based, nitrile-based, pyridine-based, 8-oxyquinoline-based, benzothiazole-based, isothiazoline-based, dithiol-based, pyridine oxide-based, nitropropane-based, organotin-based, phenol-based, quaternary ammonium salt-based, triazine-based, thiazine-based, anilide-based, adamantane-based, dithiocarbamate-based, brominated indanone-based, benzyl bromoacetate-based and inorganic salt-based ones. Specific examples of commercially available products of the antiseptic agents include Proxel GXL(S) and Proxel XL-2(S), manufactured by Arch chemicals, Inc., and Rocima 640, manufactured by Dow Chemical Co.

By using the above methods, there can easily be obtained the colorant having the dispersant on the surface and having an average particle size of 250 nm or smaller. By selecting the kind of the colorant, the kind, the acid value, and the mass average molecular weight of the dispersant, and the like, the average particle size of the colorant can be controlled. The average particle size of the colorant is usually 50 to 180 nm and preferably 60 to 150 nm.

<Inkjet Recording Ink>

An inkjet recording ink (hereinafter, referred to simply also as "ink") according to the present embodiment contains the above-mentioned dispersion according to the present embodiment, and as required, may further contain other ink preparation agents. Such ink preparation agents include solvents, surfactants, antiseptic agents, antifungal agents, pH adjusting agents, chelating agents, rust preventive agents, water-soluble ultraviolet absorbing agents, antioxidants, resin emulsions, wax agents and slipping agents.

As the solvents, organic solvents are preferable. Examples of the organic solvents include C1-C6 alkanols having 1 to 3 hydroxy groups, such as methanol, ethanol, propanol, isopropanol, butanol, isobutanol, secondary butanol, tertiary butanol, 1,2-hexanediol, 1,4-butanediol, 1,6-hexanediol, trimethylolpropane and hexane-1,2,6-triol; amides such as N,N-dimethylformamide and N,N-dimethylacetamide; lactams such as 2-pyrrolidone, N-methyl-2-pyrrolidone and N-methylpyrrolidin-2-one; cyclic ureas such as 1,3-dimethylimidazolidin-2-one and 1,3-dimethylhexahydropyrimidin-2-one; ketones or keto alcohols such as acetone, 2-methyl-2-hydroxypentan-4-one and ethylene carbonate; cyclic ethers such as tetrahydrofuran and dioxane; mono-, oligo- or poly-alkylene glycols or thioglycols having a C2-C6 alkylene unit(s), such as ethylene glycol, diethylene glycol, propylene glycol, 1,3-propanediol, 1,2-butanediol, 1,4-butanediol, 1,2-hexanediol, 1,6-hexanediol, diethylene glycol, triethylene glycol, tetraethylene glycol, dipropylene glycol, polyethylene glycol or polypropylene glycol having a molecular weight of 400 or higher, thiodiglycol and dithiodiglycol; polyols (triols) such as glycerol, diglycerol, hexane-1,2,6-triol and trimethylolpropane; glycol ethers (preferably, alkyl or alkenyl ethers of alkylene glycols having 1 to 5 (more preferably 1 to 4, still more preferably 1 to 3) C2-C4 alkanediols as a repeating unit), such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, triethylene glycol monoethyl ether, ethylene glycol monoallyl ether, ethylene glycol monoisopropyl ether, diethylene glycol monomethyl ether, propylene glycol n-butyl ether, propylene glycol monopropyl ether, triethylene glycol monobutyl ether, tripropylene glycol methyl ether, dimethyl glycol, dimethyl diglycol, dimethyl triglycol, methyl ethyl diglycol, diethyl diglycol, dibutyl diglycol, dimethyl propylene diglycol, dipropylene glycol methyl ether, dipropylene glycol n-butyl ether, dipropylene glycol n-propyl ether and 3-methoxy-3-methyl-1-buanol; γ-butyrolactone and dimethyl sulfoxide; and the like.

Among these solvents, it is preferable that a solvent is contained which is selected from glycol ethers and alkanols.

The content of the solvent is, with respect to the total mass of the ink, usually 3 to 50% by mass and preferably 5 to 40% by mass.

As the above solvent, not only a water-soluble organic solvent but also a water-insoluble organic solvent can be used. Examples of the water-insoluble organic solvent include C8-C16 (preferably, C8-C12) alkyls having a hydroxy group and an acyloxy group. Specific examples thereof include texanol. When a water-insoluble organic solvent is used, it is preferable that for example, the content ratio to a water-soluble organic solvent is regulated so that separation and the like of the solvent from the ink are not caused.

The printing speed of industrial inkjet printers is usually variable. Hence, it is preferable that the surface tension of an ink is rationally regulated according to the printing speed. The surface tension of an ink can be regulated by a surfactant.

The surfactant includes anionic, cationic, nonionic, amphoteric, silicone-based and fluorine-based surfactants.

Examples of the anionic surfactants include alkylsulfocarboxylate salts, α-olefinsulfonate salts, polyoxyethylene alkyl ether acetate salts, N-acylamino acid or salts thereof, N-acylmethyltaurine salts, alkylsulfate polyoxyalkyl ether sulfate salts, alkyl sulfate polyoxyethylene alkyl ether phosphate salts, rosin acid soaps, castor oil sulfate ester salts, lauryl alcohol sulfate ester salts, alkylphenol-type phosphate esters, alkyl-type phosphate esters, alkylarylsulfonate salts, diethyl sulfosuccinate salts, diethylhexyl sulfosuccinic acid, and dioctyl sulfosuccinate salts.

Examples of the cationic surfactants include 2-vinylpyridine derivatives and poly-4-vinylpyridine derivatives.

Examples of the amphoteric surfactants include lauryldimethylaminoacetic acid betaine, 2-alkyl-N-carboxymethyl-N-hydroxyethylimidazolinium betaine, coconut-oil-fatty-acid amidopropyldimethylaminoacetic acid betaine, polyoctylpolyaminoethylglycine and imidazoline derivatives.

Examples of the nonionic surfactants include polyoxyalkylene alkyl ethers such as polyoxyethylene nonylphenyl ether, polyoxyethylene octylphenyl ether, polyoxyethylene dodecylphenyl ether, polyoxyethylene tridecyl ether, polyoxyethylene oleyl ether, polyoxyethylene lauryl ether and polyoxyethylene alkyl ether; polyoxyalkylene acylates such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; polyoxyethylene aryl ethers such as polyoxyalkylene styrenated phenyl ether; acetylene glycol (alcohol)-based ones such as 2,4,7,9-tetramethyl-5-decyne-4,7-diol, 3,6-dimethyl-4-octyne-3,6-diol and 3,5-dimethyl-1-hexyn-3-ol; polyglycol ether-based ones; and the like. The nonionic surfactants can easily be purchased as various products, for example, Surfynol Series, such as Surfynol 465, and Olfine Series, manufactured by Nisshin Chemical Industry Co., Ltd., Emulgen Series, manufactured by Kao Corp., Newcoal Series, manufactured by Nippon Nyukazai Co., Ltd., and Noigen Series, manufactured by Daiichi Kogyo Seiyaku Co., Ltd.

Examples of the silicone-based surfactants include polyether-modified siloxane and polyether-modified polydimethylsiloxane. Examples thereof include Dynol 960 and Dynol 980, manufactured by Air Products and Chemicals, Inc.; Silface SAG001, Silface SAG002, Silface SAG003, Silface SAG005, Silface SAG503A, Silface SAG008, Silface SAG009 and Silface SAG010, manufactured by Nisshin Chemical Industry Co., Ltd.; BYK-345, BYK-347, BYK-348, BYK-349, BYK-3450, BYK-3451, BYK-3455, BYK-LP X23288, BYK-LP X23347 and BYK-LP G20726, manufactured by BYK-Chemie GmbH; and the like.

Examples of the fluorine-based surfactants include perfluoroalkylsulfonic acid compounds, perfluoroalkylcarboxylic acid-based compounds, perfluoroalkylphosphate ester compounds, perfluoroalkylethylene oxide adducts, and polyoxyalkylene ether polymer compounds having a perfluoroalkyl ether group on its side chain. Examples thereof include Zonyl TBS, FSP, FSA, FSN-100, FSN, FSO-100, FSO and FS-300, and CApstone FS-30 and FS-31, manufactured by Dupont de Nemours, Inc.; PF-151N and PF-154N, manufactured by Omnova Solutions Inc.; F-114, F-410, F-444, EXP.TF-2066, EXP.TF-2148, EXP.TF-2149, F-430, F-477, F-552, F-553, F-554, F-555, F-556, F-557, F-558, F-559, F-561, F-562, R-40, R-41, RS-72-K, RS-75, RS-76-E, RS-76-NS, RS-77, EXP.TF-1540 and EXP.TF-1760, manufactured by DIC Corp.; BYK-3440 and BYK-3441, manufactured by BYK-Chemie GmbH; and the like.

Among these, preferable are surfactants selected from nonionic and silicone-based ones.

As the antiseptics, the above-mentioned antiseptics can be used similarly.

Examples of the antifungal agents include sodium dehydroacetate, sodium benzoate, sodium pyridinethione-1-oxide, p-hydroxybenzoic acid ethyl ester, 1,2-benzisothiazolin-3-one, and salts thereof.

As the pH adjusting agents, there can be used any substances as long as the substances do not adversely affect the ink to be prepared and can regulate the pH at 5 to 11. Specific examples thereof include alkanolamines such as diethanolamine, triethanolamine and N-methyldiethanolamine; hydroxides of alkali metals, such as lithium hydroxide, sodium hydroxide and potassium hydroxide; ammonium hydroxide (ammonia water); carbonates of alkali metals, such as lithium carbonate, sodium carbonate, sodium hydrogencarbonate and potassium carbonate; alkali metal salts of organic acids, such as sodium silicate and potassium acetate; inorganic bases such as disodium phosphate; and the like.

Examples of the chelating agents include disodium ethylenediaminetetraacetate, sodium nitrilotriacetate, sodium hydroxyethylethylenediaminetriacetate, sodium diethylenetriaminepentaacetate and sodium uracildiacetate Examples of the rust preventive agents include acidic sulfite salts, sodium thiosulfate, ammonium thioglycolate, diisopropylammonium nitrite, pentaerythritol tetranitrate and dicyclohexylammonium nitrite.

Examples of the water-soluble ultraviolet absorbing agents includes sulfonated benzophenone-based compounds, benzotriazole-based compounds, salicylic acid-based compounds, cinnamic acid-based compounds and triazine-based compounds.

As the antioxidants, there can be used various kinds of organic and metal complex-based antifading agents. Examples of the organic antifading agents include hydroquinones, alkoxyphenols, dialkoxyphenols, phenols, anilines, amines, indans, chromans, alkoxyanilines and heterocycles.

It is preferable that the ink according to the present embodiment is subjected to microfiltration in order to remove foreign matter. When the microfiltration is carried out, there can be used a membrane filter, a glass filter paper, or the like. The pore size of a filter or the like in the microfiltration is usually 0.5 to 20 μm and preferably 0.5 to 10 μm.

The pH of the ink according to the present embodiment is, from the viewpoint of improving the storage stability, usually 5 to 11 and preferably 6 to 10. The surface tension at 25° C. of the ink according to the present embodiment is usually 10 to 50 mN/m and preferably 20 to 40 mN/m. The viscosity at 25° C. of the ink according to the present embodiment is usually 30 mPa·s or lower and preferably 20 mPa·s or lower. The lower limit of the viscosity is not limited, and is usually about 2 mPa·s.

<Inkjet Recording Method, Recording Medium and Inkjet Printer

An inkjet recording method according to the present embodiment ejects droplets of the above-mentioned ink according to the present embodiment from an inkjet printer to carry out recording on a recording medium.

An ink nozzle, a head and the like of the inkjet printer are not limited, and can suitably be selected according to purposes. In recent years, there have been developed actively heads with ink circulation having a mechanism of preventing drying of an ink in the region of a nozzle by circulating the ink to the vicinity of the nozzle. The inkjet recording method according to the present embodiment can suitably be applied to such heads.

As an inkjet recording system, a well-known system can be adopted. Specific examples of the inkjet recording system include a charge control system in which an ink is ejected by utilizing an electrostatic attractive force; a drop-on-demand system (also referred to as pressure pulse system) of utilizing a vibrational pressure of a piezoelectric element; an acoustic inkjet system in which an electric signal is converted to an acoustic beam, with which an ink is irradiated, and by utilizing its radiation pressure, the ink is ejected; a thermal inkjet system in which an ink is heated to form bubbles and a generated pressure is utilized; and the like.

The inkjet recording system includes also a system in which an ink called photoink and low in the content of a colorant in the ink is injected in a minute volume and in large numbers; a system of using a plurality of inks having substantially the same hue and different contents of a colorant in the inks to improve the image quality; a system of concurrently using a colorless transparent ink and an ink containing a colorant to improve the fixability of the colorant to a recording medium; and the like.

The recording medium is not limited, and preferable is an ink-poorly absorbing or an ink-non-absorbing recording medium. Examples of the ink-poorly absorbing recording medium include plain paper having no ink receiving layer; recording media used for gravure printing, offset printing and the like; art paper, coat paper, mat paper and cast paper; and the like. Then, the ink-non-absorbing recording medium includes PET (polyethylene terephthalate) sheets, PP (polypropylene) sheets, vinyl chloride sheets, glass and rubber. Here, the ink-poorly absorbing or ink-non-absorbing recording medium refers to a recording medium having the surface low in water permeability, absorbability and/or adsorbability, and includes materials which are not opened to the outside even with a large number of voids inside. More quantitatively, the ink-poorly absorbing or ink-non-absorbing recording medium refers to a recording medium in which in the Bristow method, the amount of water absorbed from contact initiation until 30 $msec^{1/2}$ is 10 $mL/m^2$ or smaller.

When the above recording medium is used, by subjecting the recording medium to a surface modification treatment, better images can be obtained.

As the surface modification treatment, it is preferable to use a treatment selected from the group consisting of corona discharge treatment, plasma treatment and flame treatment. It is usually known that a recording medium having been subjected to the surface modification treatment reduces the effect with time. Hence, it is preferable that the surface modification treatment of a recording medium and the inkjet recording on the recording medium are continuously performed. It is especially preferable that the surface modification treatment of a recording medium is carried out right before inkjet recording. The degree of the effect of the surface modification treatment of a recording medium can also be changed by regulating the number of times of the treatment, the treatment time, the treatment condition and the like.

When recording is performed on a recording medium by the inkjet recording method according to the present embodiment, for example, a container containing the ink according to the present embodiment is loaded on a predetermined position of an inkjet printer, and recording on the recording medium can be performed by the above recording method.

The inkjet recording method according to the present embodiment can also concurrently use inks in four colors of yellow, magenta, cyan and black, and as required, each ink in color of green, blue (or violet), red (or orange) or the like. The each color ink is injected in a corresponding container, and the container is then loaded on a predetermined position of an inkjet printer, and can be used for inkjet recording. Industrial inkjet printers, with the aim of making the printing speed high, preferably carry out also single-pulse printing under a constitution of a line head-type inkjet printer. The ink according to the present embodiment can provide excellent ejectability also under such a printing condition.

Combinations of preferable conditions on all above-mentioned matters are more preferable, and combinations of more preferable conditions thereon are still more preferable. The same applies to combinations of preferable conditions and more preferable conditions, and to combinations of more preferable conditions and still more preferable conditions.

EXAMPLES

Hereinafter, the present invention will be described in more detail by way of Examples, but the present invention is not any more limited to Examples.

In Examples, unless otherwise specified, any of "parts", "%" and "ppm" was in terms of mass. Any operation such as synthesis reactions and crystallization was carried out, unless otherwise specified, under stirring. In the case where the measurement of the pigment solid content in a dispersion is needed, the pigment solid content was determined by a dry weight method using an MS-70 (manufactured by A&D Co., Ltd.). Here, the pigment solid content in Examples is a value in terms of pigment solid content alone from a measurement value determined by the dry weight method.

In the present Examples, the mass average molecular weight (Mw), the molecular weight distribution (PDI), the acid value and the polymerization rate of a block copolymer were evaluated according to the following methods.

[Weight-average Molecular Weight (Mw) and Molecular Weight Distribution (PDI)]

The weight-average molecular weight (Mw) and the molecular weight distribution (PDI) were determined by gel permeation chromatography (GPC) using a high performance liquid chromatograph (type: HLC-8320, manufactured by Tosoh Corp.). Measurement samples (polymerization products) were, before measurement, subjected to methylation of carboxy groups by using a trimethylsilyldiazomethanehexane solution (concentration: 0.6 mol/L). There were used, as columns, two columns of TSKgel SuperMultipore HZ-H (φ4.6 mm×150 mm) (manufactured by Tosoh Corp.), as a mobile phase, tetrahydrofuran, and as a detector, a differential refractometer. The measurement conditions were made such that the column temperature was 40° C.; the sample concentration was 10 mg/mL; the sample injection amount was 10 µL; and the flow rate was 0.35 mL/min. The mass average molecular weight (Mw) and the number-average molecular weight (Mn) were measured by fabricating a calibration curve by using polystyrenes (TSK Standard, manufactured by Tosoh Corp.) as standard materials. The molecular weight distribution (PDI=Mw/Mn) was calculated from these measurement values.
[Acid Value]

The acid value is a value indicating the mass of potassium hydroxide needed for neutralizing acid components per 1 g of the solid content. A measurement sample was dissolved in tetrahydrofuran; as an indicator, a few drops of a phenolphthalein ethanol solution were added; and neutralization titration was carried out with a 0.1-mol/L potassium hydroxide/2-propanol solution; and the acid value (A) was calculated by the following expression.

$$A = 56.11 \times Vs \times 0.1 \times f/w$$

A: acid value (mgKOH/g)
Vs: an amount (mL) of the 0.1-mol/L potassium hydroxide/2-propanol solution needed for the titration
f: a titer of the 0.1-mol/L potassium hydroxide/propanol solution
w: a mass (g) of the measurement sample (in terms of solid content)

[Polymerization Rate]

The polymerization rate was measured by $^1$H-NMR (solvent: deuterated chloroform, internal standard: tetramethylsilane) using a nuclear magnetic resonance (NMR) measurement apparatus (model: AVANCE500 (frequency: 500 MHz), manufactured by Bruker Corp.). On an obtained NMR spectrum, there was determined the ratio of integrated intensities of peaks of vinyl groups originated from monomers and ester side chains originated from a polymer, to calculate the polymerization rate of the monomers.

<Synthesis of Dispersants (Block Copolymers)>

Synthesis Example 1: Synthesis of a Dispersant a

In a glovebox whose atmosphere had been substituted by nitrogen, there were charged and allowed to react, previously nitrogen-substituted B block monomers in proportions indicated in Table 1, ethyl-2-methyl-2-n-butyltellanyl-propionate (BTFE), dibutyl ditelluride (DBDT), 2,2'-azobis (isobutyronitrile) (AIBN) and methyl ethyl ketone (MEK). To the reaction liquid, there were added and allowed to react, previously nitrogen-substituted A block monomers in proportions indicated in Table 1. After the finish of the reaction, the reaction liquid was diluted with THF, and poured in heptane under stirring. A deposited polymer was subjected to suction filtration and dried to thereby obtain a target dispersant a. The obtained dispersant a was subjected to asking treatment and measured by inductively coupled plasma mass analysis (ICP/MS), and the total content of tellurium compounds in terms of metal tellurium was calculated. The Mw was 18,613; the PDI was 1.22; the acid value was 105 mgKOH/g; and the total content of tellurium compounds in terms of metal tellurium (hereinafter, also referred to as "metal tellurium content") was 7,519 ppm.

Synthesis Examples 2 to 19: Synthesis of Dispersants b to s

Respective dispersants b to s were obtained by carrying out the same operation as in Synthesis Example 1, except for using B block monomers and A block monomers in proportions indicated in Table 1 to Table 3, respectively. The Mw, the PDI, the acid value and the metal tellurium content of the obtained dispersants b to s were values as shown in Table 1 to Table 3.

<Synthesis of a Dispersant (Random Copolymer)>

Synthesis Example 20: Synthesis of a Dispersant t

In a glovebox whose atmosphere had been substituted by nitrogen, there were charged and allowed to react, previously nitrogen-substituted monomers in proportions indicated in Table 4, BTFE, DBDT, AIBN and MEK. After the finish of the reaction, the reaction liquid was diluted with THF, and poured in heptane under stirring. A deposited polymer was subjected to suction filtration and dried to thereby obtain a target dispersant t. The obtained dispersant t was subjected to asking treatment and measured by inductively coupled plasma mass analysis (ICP/MS), and the total content of tellurium compounds in terms of metal tellurium was calculated. The Mw was 19,603; the PDI was 1.33; the acid value was 121 mgKOH/g; and the metal tellurium content was 297 ppm.

TABLE 1

| | | | Synthesis Example | | | | | | |
|---|---|---|---|---|---|---|---|---|---|
| | | | 1 | 2 | 3 | 4 | 5 | 6 | 7 |
| Block Copolymer | | | a | b | c | d | e | f | g |
| Monomer used (Content Ratio) | A Block Monomer | BMA | 39.1 | 39.1 | 39.1 | 39.1 | 39.1 | 39.1 | 31.8 |
| | | MAA | 15.5 | 15.5 | 15.5 | 15.5 | 15.5 | 15.5 | 22.7 |
| | B Block Monomer | CHMA | 45.0 | 45.0 | 45.0 | 45.0 | 45.0 | 45.0 | 45.0 |
| | | MAA | 0.5 | 0.5 | 0.5 | 0.5 | 0.5 | 0.5 | 0.5 |
| | A Block/B Block | | 55/45 | 55/45 | 55/45 | 55/45 | 55/45 | 55/45 | 55/45 |
| | MMA Ratio in A Block | | 28% | 28% | 28% | 28% | 28% | 28% | 42% |
| Physical Properties of Block Copolymer | Mw | | 18613 | 18613 | 18613 | 18613 | 22162 | 26924 | 13319 |
| | PDI | | 1.22 | 1.22 | 1.22 | 1.22 | 1.23 | 1.23 | 1.26 |
| | Acid Value (mgKOH/g) | | 105 | 104 | 106 | 108 | 109 | 111 | 151 |
| | Metal Tellurium Content (ppm) | | 7519 | 4404 | 1710 | 235 | 345 | 311 | 298 |

TABLE 2

| | Block Copolymer | | Synthesis Example | | | | | | |
|---|---|---|---|---|---|---|---|---|---|
| | | | 8 h | 9 i | 10 j | 11 k | 12 l | 13 m | 14 n |
| Monomer used (Content Ratio) | A Block Monomer | BMA | 31.8 | 36.4 | 35.5 | 41.4 | 40.0 | 31.7 | 39.1 |
| | | MAA | 22.7 | 18.2 | 19.1 | 13.2 | 13.5 | 12.8 | 15.5 |
| | B Block Monomer | CHMA | 45.0 | 45.0 | 45.0 | 45.0 | 46.0 | 55.0 | |
| | | BzMA | | | | | | | 45.0 |
| | | MAA | 0.5 | 0.5 | 0.5 | 0.5 | 0.5 | 0.6 | 0.5 |
| | A Block/B Block | | 55/45 | 55/45 | 55/45 | 55/45 | 53/47 | 44/56 | 55/45 |
| | MMA Ratio in A Block | | 42% | 33% | 35% | 24% | 25% | 29% | 28% |
| Physical Properties of Block Copolymer | Mw | | 40109 | 17837 | 18306 | 7248 | 18120 | 21288 | 17570 |
| | PDI | | 1.39 | 1.29 | 1.26 | 1.26 | 1.25 | 1.25 | 1.43 |
| | Acid Value (mgKOH/g) | | 159 | 122 | 133 | 94 | 95 | 91 | 105 |
| | Metal Tellurium Content (ppm) | | 401 | 254 | 277 | 355 | 302 | 288 | 312 |

TABLE 3

| | Block Copolymer | | Synthesis Example | | | | |
|---|---|---|---|---|---|---|---|
| | | | 15 o | 16 p | 17 q | 18 r | 19 s |
| Monomer used (Content Ratio) | A Block Monomer | BMA | 26.9 | 39.1 | 39.1 | 37.6 | 34.4 |
| | | MAA | 15.9 | 15.5 | 15.5 | 16.9 | 20.2 |
| | B Block Monomer | CHMA | | | | 45.0 | 45.0 |
| | | BzMA | 57.2 | | | | |
| | | IBXMA | | 45.0 | | | |
| | | DCPMA | | | 45.0 | | |
| | | MAA | 0.1 | 0.5 | 0.5 | 0.5 | 0.5 |
| | A Block/B Block | | 43/57 | 55/45 | 55/45 | 45/55 | 45/55 |
| | MMA Ratio in A Block | | 37% | 28% | 28% | 31% | 37% |
| Physical Properties of Block Copolymer | Mw | | 22495 | 17736 | 18921 | 18433 | 18369 |
| | PDI | | 1.36 | 1.22 | 1.26 | 1.31 | 1.32 |
| | Acid Value (mgKOH/g) | | 105 | 114 | 113 | 117 | 138 |
| | Metal Tellurium Content (ppm) | | 222 | 278 | 315 | 301 | 288 |

TABLE 4

| | Random Copolymer | | Synthesis Example 20 t |
|---|---|---|---|
| Monomer used (Content Ratio) | | BMA | 37.0 |
| | | MAA | 18.0 |
| | | CHMA | 45.0 |
| Physical Properties of Random Copolymer | Mw | | 19603 |
| | PDI | | 1.33 |
| | Acid Value (mgKOH/g) | | 121 |
| | Metal Tellurium Content (ppm) | | 297 |

The meanings of abbreviations in Table 1 to Table 4 are as follows.

BMA: butyl methacrylate
MAA: methacrylic acid
CHMA: cyclohexyl methacrylate
BzMa: benzyl methacrylate
IBXMA: isobornyl methacrylate
DCPMA: dicyclopentanyl methacrylate <Preparation of Dispersions>

Preparation Example 1: Preparation of a Dispersion a

The dispersant a (5.4 parts) obtained in Synthesis Example 1 was dissolved in 2-butanone (12.5 parts) to make a homogeneous solution. Thereto, there was added a liquid in which a 28% ammonia aqueous solution (0.6 part) was dissolved in ion-exchange water (62.7 parts); and there were further added and thereafter stirred for 1 hour, Surfynol DF-58 (manufactured by Nisshin Chemical Industry Co., Ltd.) (0.3 part) and Rocima 640 (manufactured by Dow Chemical Co.) (0.5 part), to thereby prepare an emulsion solution in which the dispersant was dissolved. At this time, there was no deposition of crystals. Thereto, C.I. Pigment Red 122 (Ink Jet Magenta E 02, manufactured by Clariant International Ltd.) (18.0 part) was added so that the division ratio became 0.3, and was dispersed by a sand grinder (6TSG-1/8 type, manufactured by IMEX Co., Ltd.). The dispersing was carried out at 1,500 rpm for 10 hours. Thereafter, an ion-exchange water (100 parts) was dropwise charged, and filtered to remove dispersing beads; thereafter, 2-butanone and a part of water were distilled away under reduced pressure by an evaporator to thereby obtain a dispersion a having a pigment solid content of 12%. Since the division ratio was 0.3 as described above, the dispersant concentration in the dispersion a was 3.6% on calculation, and the metal tellurium content in the dispersant a was 7,519 ppm as described above; so the metal tellurium content in the total mass of the dispersion a was determined as being 271 ppm on calculation.

Preparation Examples 2 to 20: Preparation of Dispersions b to t

Dispersions b to t were prepared by mixing components indicated in the following Table 5 to Table 7 as in Preparation Example 1.

TABLE 5

| | Preparation Example | | | | | | |
|---|---|---|---|---|---|---|---|
| | 1 | 2 | 3 | 4 | 5 | 6 | 7 |
| Dispersion | a | b | c | d | e | f | g |
| Ink Jet Magenta E 02 | 18.0 | 18.0 | 18.0 | 18.0 | 18.0 | 18.0 | 18.0 |
| Dispersant a (Block Copolymer) | 5.4 | | | | | | |
| Dispersant b (Block Copolymer) | | 5.4 | | | | | |
| Dispersant c (Block Copolymer) | | | 5.4 | | | | |
| Dispersant d (Block Copolymer) | | | | 5.4 | | | |
| Dispersant e (Block Copolymer) | | | | | 5.4 | | |
| Dispersant f (Block Copolymer) | | | | | | 5.4 | |
| Dispersant g (Block Copolymer) | | | | | | | 5.4 |
| 2-butanone | 12.5 | 12.5 | 12.5 | 12.5 | 12.5 | 12.5 | 12.5 |
| Surfynol DF-58 | 0.3 | 0.3 | 0.3 | 0.3 | 0.3 | 0.3 | 0.3 |
| Rocima 640 | 0.5 | 0.5 | 0.5 | 0.5 | 0.5 | 0.5 | 0.5 |
| 28% ammonia aqueous solution | 0.6 | 0.6 | 0.6 | 0.6 | 0.6 | 0.6 | 0.9 |
| Ion-exchange water | Balance | | | | | | |
| Total | 100 | 100 | 100 | 100 | 100 | 100 | 100 |
| Pigment Solid Content | 12% | 12% | 12% | 12% | 11% | 12% | 12% |
| Metal Tellurium Content (ppm) | 271 | 159 | 62 | 8 | 11 | 11 | 11 |

TABLE 6

| | Preparation Example | | | | | | |
|---|---|---|---|---|---|---|---|
| | 8 | 9 | 10 | 11 | 12 | 13 | 14 |
| Dispersion | h | i | j | k | l | m | n |
| Ink Jet Magenta E 02 | 18.0 | 18.0 | 18.0 | 18.0 | 18.0 | 18.0 | 18.0 |
| Dispersant h (Block Copolymer) | 5.4 | | | | | | |
| Dispersant i (Block Copolymer) | | 5.4 | | | | | |
| Dispersant j (Block Copolymer) | | | 5.4 | | | | |
| Dispersant k (Block Copolymer) | | | | 5.4 | | | |
| Dispersant l (Block Copolymer) | | | | | 5.4 | | |
| Dispersant m (Block Copolymer) | | | | | | 5.4 | |
| Dispersant n (Block Copolymer) | | | | | | | 5.4 |
| 2-butanone | 24.6 | 12.5 | 12.5 | 12.5 | 12.5 | 12.5 | 22.0 |
| Surfynol DF-58 | 0.3 | 0.3 | 0.3 | 0.3 | 0.3 | 0.3 | 0.3 |
| Rocima 640 | 0.5 | 0.5 | 0.5 | 0.5 | 0.5 | 0.5 | 0.5 |
| 28% ammonia aqueous solution | 0.9 | 0.7 | 0.8 | 0.5 | 0.5 | 0.5 | 0.6 |
| Ion-exchange water | Balance | | | | | | |
| Total | 100 | 100 | 100 | 100 | 100 | 100 | 100 |
| Pigment Solid Content | 11% | 13% | 11% | 13% | 12% | 10% | 12% |
| Metal Tellurium Content (ppm) | 13 | 10 | 9 | 14 | 11 | 9 | 11 |

TABLE 7

| | Preparation Example | | | | | |
|---|---|---|---|---|---|---|
| | 15 | 16 | 17 | 18 | 19 | 20 |
| Dispersion | o | p | q | r | s | t |
| Ink Jet Magenta E 02 | 18.0 | 18.0 | 18.0 | 18.0 | 18.0 | 18.0 |
| Dispersant o (Block Copolymer) | 5.4 | | | | | |
| Dispersant p (Block Copolymer) | | 5.4 | | | | |
| Dispersant q (Block Copolymer) | | | 5.4 | | | |
| Dispersant r (Block Copolymer) | | | | 5.4 | | |
| Dispersant s (Block Copolymer) | | | | | 5.4 | |
| Dispersant t (Random Copolymer) | | | | | | 5.4 |
| 2-butanone | 22.0 | 12.5 | 12.5 | 12.5 | 12.5 | 12.5 |
| Surfynol DF-58 | 0.3 | 0.3 | 0.3 | 0.3 | 0.3 | 0.3 |
| Rocima 640 | 0.5 | 0.5 | 0.5 | 0.5 | 0.5 | 0.5 |
| 28% ammonia aqueous solution | 0.6 | 0.7 | 0.7 | 0.7 | 0.8 | 0.7 |
| Ion-exchange water | Balance | | | | | |
| Total | 100 | 100 | 100 | 100 | 100 | 100 |
| Pigment Solid Content | 12% | 12% | 12% | 12% | 12% | 12% |
| Metal Tellurium Content (ppm) | 8 | 10 | 11 | 11 | 10 | 11 |

<Preparation of Inks>

Examples 1 to 12 and Comparative Examples 1 to 8

The dispersions obtained in the above Preparation Examples 1 to 20 were mixed with each component indicated in Table 8 to Table 10, respectively, and thereafter, were filtered with a syringe filter of 5 μm in pore size (Minisart, manufactured by Sartorius AG) to thereby obtain inks of Examples 1 to 12 and Comparative Examples 1 to 8, respectively. The balance was adjusted with ion-exchange water so that the pigment solid content of each ink became 5%.

TABLE 8

| | Example | | | | | |
|---|---|---|---|---|---|---|
| | 1 | 2 | 3 | 4 | 5 | 6 |
| Dispersion a | 41.7 | | | | | |
| Dispersion b | | 41.7 | | | | |
| Dispersion c | | | 41.7 | | | |
| Dispersion d | | | | 41.7 | | |
| Dispersion e | | | | | 45.5 | |
| Dispersion f | | | | | | 41.7 |
| Dipropylene glycol-n-propyl ether | 10.0 | 10.0 | 10.0 | 10.0 | 10.0 | 10.0 |

TABLE 8-continued

| | Example | | | | | |
|---|---|---|---|---|---|---|
| | 1 | 2 | 3 | 4 | 5 | 6 |
| Ethylene glycol monoisopropyl ether | 10.0 | 10.0 | 10.0 | 10.0 | 10.0 | 10.0 |
| 3-methoty-3-methyl-1-butanol | 5.0 | 5.0 | 5.0 | 5.0 | 5.0 | 5.0 |
| BYK-3450 | 0.7 | 0.7 | 0.7 | 0.7 | 0.7 | 0.7 |
| Ion-exchange water | Balance | | | | | |
| Total | 100 | 100 | 100 | 100 | 100 | 100 |

TABLE 9

| | Example | | | | | |
|---|---|---|---|---|---|---|
| | 7 | 8 | 9 | 10 | 11 | 12 |
| Dispersion g | 41.7 | | | | | |
| Dispersion h | | 45.5 | | | | |
| Dispersion i | | | 38.5 | | | |
| Dispersion j | | | | 45.5 | | |
| Dispersion r | | | | | 41.7 | |
| Dispersion s | | | | | | 41.7 |
| Dipropylene glycol-n-propyl ether | 10.0 | 10.0 | 10.0 | 10.0 | 10.0 | 10.0 |
| Ethylene glycol monoisopropyl ether | 10.0 | 10.0 | 10.0 | 10.0 | 10.0 | 10.0 |
| 3-methoxy-3-methyl-1-butanol | 5.0 | 5.0 | 5.0 | 5.0 | 5.0 | 5.0 |
| BYK-3450 | 0.7 | 0.7 | 0.7 | 0.7 | 0.7 | 0.7 |
| Ion-exchange water | Balance | | | | | |
| Total | 100 | 100 | 100 | 100 | 100 | 100 |

TABLE 10

| | Comparative Example | | | | | | | |
|---|---|---|---|---|---|---|---|---|
| | 1 | 2 | 3 | 4 | 5 | 6 | 7 | 8 |
| Dispersion k | 38.5 | | | | | | | |
| Dispersion l | | 41.7 | | | | | | |
| Dispersion m | | | 50.0 | | | | | |
| Dispersion n | | | | 41.7 | | | | |
| Dispersion o | | | | | 41.7 | | | |
| Dispersion p | | | | | | 41.7 | | |
| Dispersion q | | | | | | | 41.7 | |
| Dispersion t | | | | | | | | 41.7 |
| Dipropylene glycol-n-propyl ether | 10.0 | 10.0 | 10.0 | 10.0 | 10.0 | 10.0 | 10.0 | 10.0 |
| Ethylene glycol monoisopropyl ether | 10.0 | 10.0 | 10.0 | 10.0 | 10.0 | 10.0 | 10.0 | 10.0 |
| 3-methoxy-3-methyl-1-butanol | 5.0 | 5.0 | 5.0 | 5.0 | 5.0 | 5.0 | 5.0 | 5.0 |
| BYK-3450 | 0.7 | 0.7 | 0.7 | 0.7 | 0.7 | 0.7 | 0.7 | 0.7 |
| Ion-exchange water | Balance | | | | | | | |
| Total | 100 | 100 | 100 | 100 | 100 | 100 | 100 | 100 |

The meanings of abbreviations in Table 8 to Table 10 are as follows.

BYK3450: a silicone-based surfactant (manufactured by BYK-Chemie GmbH)

<Preparation of a Clear Ink>

Dipropylene glycol-n-propyl ether (30.0 parts), ethylene glycol monoisopropyl ether (30.0 parts), 3-methoxy-3-methyl-1-butanol (15.0 parts), BYK3450 (manufactured by BYK Chemie GmbH) (2.1 parts) and ion-exchange water (207.9 parts) were mixed, and thereafter filtered with a membrane filter of 0.45 μm in pore size (Advantec Dismic-25CS, manufactured by Toyo Roshi Kaisha, Ltd.) to thereby obtain a colorless transparent clear ink.

The present clear ink was a liquid composition supposed to be a composition obtained by excluding the pigment solid content from each ink of the above Examples and Comparative Examples. Even if an ink was dried in the region of a nozzle of an inkjet head, the dried ink was re-dispersed by the ink itself fed from in the head, whereby it became difficult for clogging to be caused and the ejection stability could be guaranteed. Therefore, an ink which, when the above clear ink was added to the ink having been dried, exhibited easier re-dispersion means an ink more hardly causing clogging of a nozzle after drying, and can be said to be excellent.

<Evaluations>

[Evaluation of the Re-Dispersibility]

An ink of the above Examples 1 to 12 and Comparative Examples 1 to 8 was dropped in 20 μL on a glass laboratory dish of φ67 mm, and statically dried in a thermohygrostatic chamber at 45° C. for 10 min to thereby obtain a dried ink. Thereafter, 10 mL of the above clear ink was dropped on the dried ink, and the glass laboratory dish was slowly shaken and allowed to stand still for 1 hour. Thereafter, the glass laboratory dish was again shaken; and whether or not re-dispersion occurred was visually observed and the re-dispersibility was evaluated according to the following criteria. The results are shown in Table 11 and Table 12. Since a re-dispersed colored solution spread like bleeding without generating residues, the re-dispersibility could be judged visually. It can be said that the more the residues, the worse the re-dispersibility. It is practically desirable that the following evaluation is 3 or more.

—Evaluation Criteria—

5: there were no residues, and the dried ink was completely re-dispersed.
4: there was observed very little of residues, but the dried ink was almost re-dispersed
3: there was a little of residues, but the dried ink was re-dispersed in some degree.
2: there was observed much of residues, and the dried ink was not too much re-dispersed.
1: the dried ink did not change and was scarcely re-dispersed.

[Evaluation of the Water Resistance]

An ink of the above Examples 1 to 12 and Comparative Examples 1 to 8 was dropped in 20 μL on a PET film (E5102, manufactured by Toyobo Co., Ltd.), and coated thereon by using a bar coater No. 3 (manufactured by Yasuda Seiki Seisakusho, Ltd.) by an automatic coating machine (PI-1210, manufactured by Tester Sangyo Co., Ltd.). Thereafter, the coated PET film was statically dried in a thermohygrostatic device at 70° C. for 3 min. Then, the ink coating film was rubbed reciprocally in a 1-cm width with a cotton swab wetted with ion-exchange water, and the number of times of the reciprocation until the ink coating film of the rubbing portion was completely peeled off was measured. The measurement was carried out on five portions in total of the same coating film, and the water resistance was evaluated by using the average value of the reciprocating times. The results are shown in Table 11 and Table 12. It is indicated that the more the reciprocating times until the ink coating film was peeled off, the better the water resistance, and it is practically desirable that the reciprocating times is 6 or more. In Table 11 and Table 12, the numerical value in the column of "Water Resistance" is the reciprocating times.

TABLE 11

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Re-dispersibility (Five-Step Evaluation) | 3 | 3 | 3 | 3 | 4 | 3 | 4 | 3 | 4 | 5 | 4 | 5 |
| Water Resistance (Reciprocating Times) | 7 | 9 | 10 | 10 | 8 | 11 | 10 | 12 | 16 | 10 | 14 | 11 |

TABLE 12

| | Comparative Example | | | | | | | |
|---|---|---|---|---|---|---|---|---|
| | 1 | 2 | 3 | 4 | 5 | 6 | 7 | 8 |
| Re-dispersibility (Five-Step Evaluation) | 1 | 2 | 3 | 1 | 2 | 1 | 2 | 1 |
| Water Resistance (Reciprocating Times) | 5 | 4 | 4 | 7 | 10 | 3 | 9 | 4 |

As is clear from Table 11, Example 1 is Example in which good re-dispersibility and water resistance were both simultaneously satisfied. Then, Examples 2 to 4 were Examples in which the metal tellurium content in the dispersion was low as compared with Example 1, and it is made clear that the water resistance was further improved with the same-level re-dispersibility retained. This is conceivably because since due to that the metal tellurium content originated from the dispersant was low, the adsorption force of the dispersant to the colorant increased and the dispersing stability was improved, even when the ink underwent drying after coating of the ink, the colorant was not aggregated and a smooth coating film could be formed with a better dispersing state.

Examples 5 to 8 were Examples in which values of physical properties of the structure of the block copolymer, such as the Mw, the acid value and the MAA content ratio in the A block, were each high as compared with Example 4, but it is made clear that good re-dispersibility and water resistance were both simultaneously satisfied as in Example 4.

Examples 9 to 12 were especially preferable forms, and were Examples in which excellent re-dispersibility and water resistance were both simultaneously satisfied.

By contrast, Comparative Example 8 was an Example using a random copolymer having nearly the same monomer ratios and physical properties as the block copolymer of Example 9, but gave very poor results to either of the re-dispersibility and the water resistance as compared with Examples. This is conceivably because since due to that the hydrophilic moieties and the hydrophobic moieties were randomly arranged, the hydrophilicity to a liquid medium was low and the dispersing stability was also inferior, the dispersant was easily desorbed in drying and the colorant was aggregated. From this Example, it is indicated that the structure of the block copolymer exhibited an excellent effect on the re-dispersibility and the water resistance.

Comparative Example 1 was an Example in which any of the Mw, the acid value and the MAA content ratio in the A block was low as compared with in Examples, and was very poor in the re-dispersibility and also gave an inferior result to the water resistance.

Comparative Example 2 was also an Example in which the acid value and the MAA content ratio in the A block were low, and gave poor results to either of the re-dispersibility and the water resistance.

Comparative Example 3 was an Example in which the acid value was low, and gave a poor result to the water resistance. From the above Comparative Examples 1 to 3, it is made clear that by using a dispersant balanced among the Mw, the acid value and the MAA content ratio in the A block, and the polymer structure and the physical properties, good re-dispersibility and water resistance of an ink could be both simultaneously satisfied.

Comparative Examples 4 and 5 were Examples in which the B block was constituted of benzyl methacrylate being a cyclic aromatic hydrocarbon having a planar structure, and gave poor results to the re-dispersibility as compared with Examples.

Comparative Example 6 was an Example in which the B block was constituted of isobornyl methacrylate, which is a polycyclic saturated hydrocarbon which is restricted in the conformation which can be structurally assumed, and gave very poor results to either of the re-dispersibility and the water resistance as compared with Examples. Similarly, Comparative Example 7 was an Example in which the B block was constituted of dicyclopentanyl methacrylate, but this case also gave a poor result to the re-dispersibility.

From the above Comparative Examples 4 to 7, it is made clear that even when the conditions were met as the structure and the physical properties of the block copolymer, if the monomer kind constituting the hydrophobic moiety was changed, it became difficult for the re-dispersibility and the water resistance to be both simultaneously satisfied. Therefore, cyclohexyl methacrylate, which was a B block monomer in the present Examples, was a preferable form.

From the above results of Table 11 and Table 12, it is indicated that an ink of each Example was an excellent ink having both a high re-dispersibility and a high water resistance as compared with an ink of each Comparative Example.

The invention claimed is:

1. A colored dispersion for inkjet, comprising a colorant, a dispersant, a tellurium compound, and water,
   wherein the dispersant is an A-B block polymer; monomers constituting the A block of the A-B block polymer are (meth) acrylic acid and butyl (meth) acrylate; a content of the (meth) acrylic acid in the total mass of the monomers constituting the A block is 26 to 42% by mass; and a monomer constituting the B block of the A-B block polymer comprises cyclohexyl (meth) acrylate;
   the dispersant has an acid value of 100 to 159 mgKOH/g; and
   the dispersant has a mass average molecular weight of 10,000 to 50,000.

2. The colored dispersion for inkjet according to claim 1, wherein a total content of the tellurium compound in terms of metal tellurium is 160 ppm or lower in terms of mass.

3. The colored dispersion for inkjet according to claim 1, wherein the dispersant has an acid value of 112 to 135 mgKOH/g.

4. The colored dispersion for inkjet according to claim 1, wherein the dispersant has a mass average molecular weight of 10,000 to 30,000.

5. The colored dispersion for inkjet according to claim 1, wherein the colorant is a colorant selected from the group consisting of pigments and disperse dyes.

6. The colored dispersion for inkjet according to claim 1, wherein the monomer constituting the B block of the A-B block polymer comprises (meth) acrylic acid.

7. An inkjet recording ink, comprising the colored dispersion for inkjet according to claim 1.

8. An inkjet recording method, wherein recording is performed by ejecting droplets of the inkjet recording ink according to claim 7 and causing the droplets to adhere to a recording medium.

9. The inkjet recording method according to claim 8, wherein the recording medium is an ink-poorly absorbing or ink-non-absorbing recording medium.

10. The inkjet recording method according to claim 9, wherein the recording medium is a recording medium having been subjected to at least one surface modification treatment selected from the group consisting of corona discharge treatment, plasma treatment and flame treatment.

11. A recording medium, to which the inkjet recording ink according to claim 7 adheres.

12. An inkjet printer loaded with a container containing the inkjet recording ink according to claim 7.

13. A method for producing the colored dispersion for inkjet according to claim 1, comprising coating a surface of the colorant with the dispersant.

14. The production method according to claim 13, wherein the surface of the colorant is coated with the dispersant by a phase inversion emulsification method.

* * * * *